UNITED STATES PATENT OFFICE.

HERMANN KRAFT, OF BASEL, SWITZERLAND, ASSIGNOR TO SOCIETY OF CHEMICAL INDUSTRY IN BASLE, OF BASEL, SWITZERLAND.

VAT DYE AND PROCESS OF MAKING SAME.

941,152.     Specification of Letters Patent.     Patented Nov. 23, 1909.

No Drawing.     Application filed April 1, 1909. Serial No. 487,275.

*To all whom it may concern:*

Be it known that I, HERMANN KRAFT, doctor of philosophy and chemist, a subject of the Emperor of Austria-Hungary, and resident of Basel, Switzerland, have invented new and useful Vat Dyestuffs and a Process of Making Same, of which the following is a full, clear, and exact specification.

I have found that by condensing halogen-substituted isatin derivatives of the naphthalene series with 3-oxy-1-thionaphthene new vat-dyestuffs of the thioindigo series are obtained, which dye cotton brown-violet and violet-gray to violet-black shades. The manufacture of these dyestuffs is illustrated by the following examples.

Example I. 4.5 parts of monobromobeta-naphthisatin chlorid (obtained by treating monobromobetanaphthisatin with phosphorus pentachlorid), 2.3 parts of oxythionaphthene and 50 parts of xylene are boiled together for ½ hour. The solution assumes a violet coloration and while hydrochloric acid is split off a reddish black, crystalline condensation product separates. The said product is recovered by filtration and washed with alcohol. It dissolves in benzene and in nitrobenzene with a red-violet coloration. Its solution in concentrated sulfuric acid is dirty green. With alkaline reducing agents it yields a deep orange vat dyeing cotton deep gray to violet black tints of excellent fastness.

Example II. 35.5 parts of dibromobeta-naphthisatin melting at 300° C. (prepared for instance by brominating betanaphthisatin in nitrobenzene in the heat) and 15 parts of 3-oxy-1-thionaphthene are heated together with 250 parts of nitrobenzene for 1½ to 2 hours in an oil bath to 210–230° C. After cooling, the condensation product is separated by filtration, washed with alcohol and dried. The so obtained deep brown-red crystalline powder dissolves in concentrated sulfuric acid to a greenish blue solution. It dissolves difficultly in hot benzene and in alcohol with red coloration and easily in hot nitrobenzene with a cherry-red coloration. In order to permit an easier preparation of a vat with the dye-stuff, the latter is advantageously first treated with an alcoholic alkali sulfhydrate, which dissolves the said dyestuff to a green-yellow solution from which the dyestuff is again blown out with air as a paste directly employed for dyeing. It dyes cotton from an alkaline vat gray-violet tints of a good fastness to washing, light and chlorin.

If in the foregoing example, there is substituted for the dibromobetanaphthisatin bromoalphanaphthisatin melting at 286–287° C. (obtained by brominating alpha-naphthisatin in glacial acetic acid in the heat) there is obtained a dyestuff dyeing cotton from an alkaline vat brown-violet shades fast to washing, light and chlorin.

Example III. 37.3 parts of dibromobeta-naphthisatin chlorid (obtainable by treating dibromobetanaphthisatin with phosphorus pentachlorid in presence of an indifferent diluting agent as for instance pentachlorethane) and 15 parts of 3-oxy-1-thionaphthene are boiled with 300 to 400 parts of xylene for about 1 hour. After a short time, the reaction takes place and the solution assumes a cherry-red coloration while the dyestuff separates. It is isolated by filtration, washed with alcohol and dried. The condensation product constitutes a brown-red powder and yields with sodium hydrosulfite a brownish colored vat dyeing cotton violet-gray tints of excellent fastness to washing, light and chlorin.

What I claim is:

1. The described process for the manufacture of halogenized vat-dyestuffs of the thioindigo series, which consists in condensing 1 mol. of a halogen substituted isatin derivative of the naphthalene series with 1 mol. of 3-oxy-1-thionaphthene.

2. The described process for the manufacture of halogenized cat-dyestuffs of the thioindigo series, which consists in condensing 1 mol. of a brominated naphthisatin with 1 mol. of 3-oxy-1-thionaphthene.

3. As new products, the described halogenized vat dyestuffs, derived from a halogenated naphthisatin and 3-oxy-1-thionaphthene, and constituting in dry state brownish-red powders soluble in concentrated sulfuric acid with a green to greenish blue color, soluble in hot nitrobenzene with a cherry-red to red-violet coloration and yielding by their treatment with alkaline
5 reducing agents vats dyeing cotton brownish - violet and gray - violet to violet - black shades fast to washing, light and chlorin.

In witness whereof I have hereunto signed my name this 20th day of March 1909, in the presence of two subscribing witnesses.

HERMANN KRAFT.

Witnesses:
 Geo. Gifford,
 Arnold Zuber.

Correction in Letters Patent No. 941,152.

It is hereby certified that in Letters Patent No. 941,152, granted November 23, 1909, upon the application of Hermann Kraft, of Basel, Switzerland, for an improvement in "Vat Dyes and Processes of Making Same," an error appears in the printed specification requiring correction, as follows: Page 1, line 92, the compound word "cat-dyestuffs" should read *vat-dyestuffs;* and that the said Letters Patent should be read with this correction therein that the same may conform to the record of the case in the Patent Office.

Signed and sealed this 25th day of January, A. D., 1910.

[SEAL.]

C. C. BILLINGS,
*Acting Commissioner of Patents.*